Nov. 13, 1956     H. J. RAND     2,770,443
MULTIPLE SEAL VALVE
Filed Feb. 12, 1949
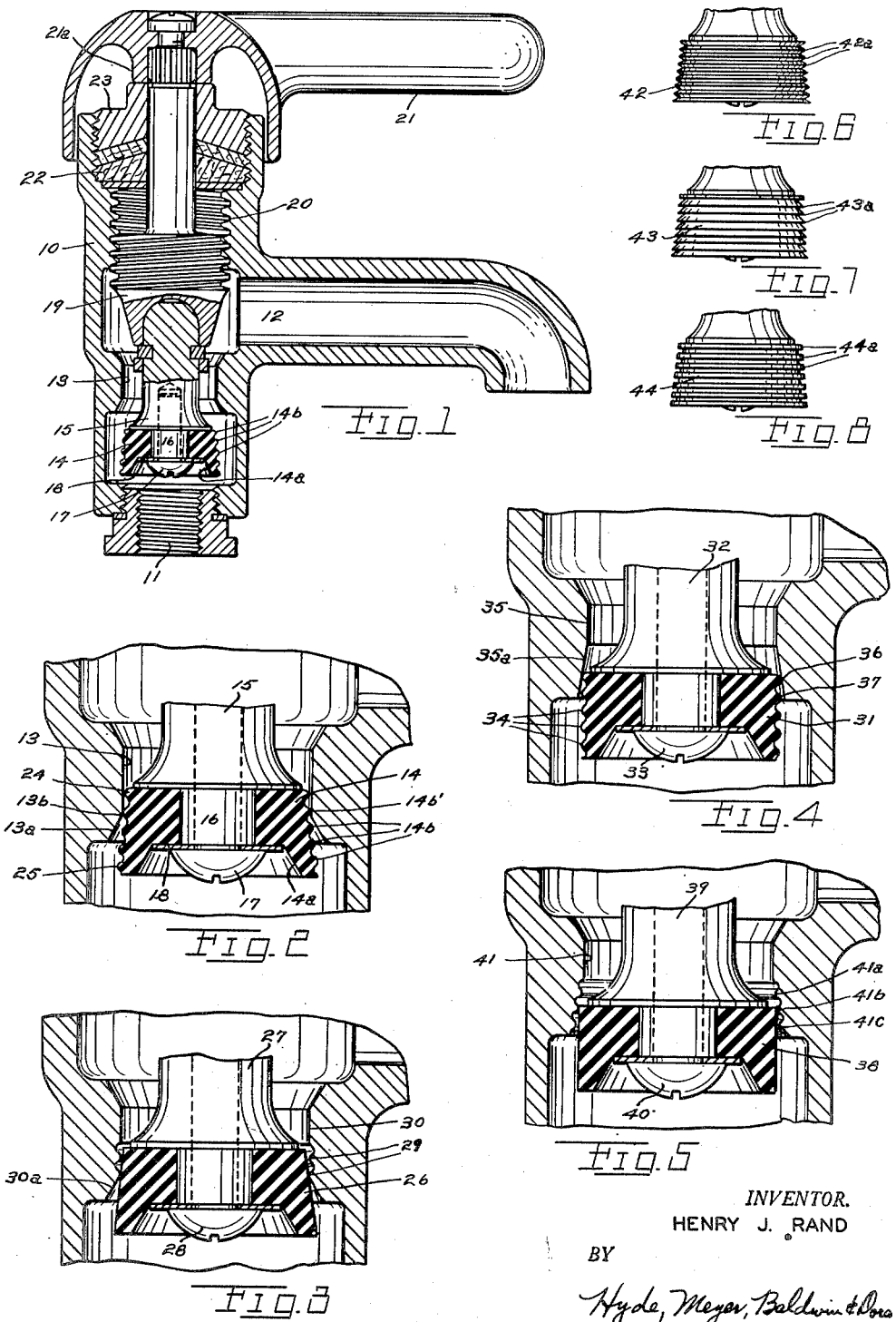
INVENTOR.
HENRY J. RAND
BY
Hyde, Meyer, Baldwin & Doss
ATTORNEYS

United States Patent Office 2,770,443
Patented Nov. 13, 1956

2,770,443
MULTIPLE SEAL VALVE

Henry J. Rand, Bratenahl, Ohio, assignor to Magic Seal, Inc., Bratenahl, Ohio, a corporation of Ohio Application February 12, 1949, Serial No. 76,072

5 Claims. (Cl. 251—333)

This invention relates to improvements in a valve and more particularly to a drip proof valve which is opened and closed by a feather touch, and which provides a plurality of annular line seals progressively available when closing the valve.

One of the objects of the present invention is to provide an improved valve of the type wherein a plug closing in the direction of fluid flow provides an annular line seal in the bore of the valve housing, and wherein novel means is provided for obtaining such a plurality of line seals progressively available as the plug becomes worn. The invention may use a plurality of serrations on the sealing plug itself or the serrations may be provided in the bore of the valve as will presently appear.

In the drawings,

Fig. 1 is a central sectional view through a valve of the faucet type embodying the present invention and showing the valve in open position;

Fig. 2 is an enlarged fragmental sectional view of certain parts of Fig. 1 showing the valve in closed position;

Fig. 3 is a view similar to Fig. 2, wherein the serrations or corrugations are provided in the bore of the valve housing rather than on the sealing plug as in Fig. 2;

Fig. 4 is a view similar to Figs. 2 and 3, but indicating a serrated generally cylindrical plug sealing in the tapered bore of the valve housing;

Fig. 5 is a sectional view similar to Fig. 3 showing a plane cylindrical sealing plug coacting with corrugations arranged generally in tapered form in the inner wall of the bore of the valve housing; while Figs. 6, 7, and 8 are side elevational views of other sealing plugs utilizing other forms of sealing ribs.

My invention is applicable to many types of valves and faucets and I have chosen to illustrate the same as applied to a well known type of faucet. Hereafter, the word faucet will be used in connection with the description, but it should be understood that my invention is equally applicable to many types of valves.

The present invention is directed to a type of valve comprising a housing 10 having a fluid inlet 11 and a fluid outlet 12 and a generally cylindrical bore 13 between the inlet and outlet. A resilient plug type seal 14 is adapted to be passed down through the bore from the downstream side thereof to a position on the upstream side thereof and thereafter the plug moves into the upstream end of the bore 13 to seal the same with a line contact. The plug 14 is mounted on a stem 15 in such a manner as to support the upper wall of the plug almost to the periphery of the top face thereof so as to prevent singing and chattering of the valve when it is closing. To this end, the stem portion 15 has a central cylindrical projection 16 which is adapted to receive a screw 17 which is threaded into the stem portion 15. Preferably, but not necessarily, the plug 14 has an annular downwardly extending flange 14a and an annular disk washer of rigid character 18 engages against the cup-like bottom of the plug 14 beneath the head of screw 17 so as to hold the plug firmly in position on the stem. The thickness of the main body of the plug 14 is slightly greater when in its unstressed condition than the height of the projection 16 so that when the screw 17 is drawn down tight the plug is held firmly against the flat bottom of the stem portion 15 but is not pressed so strongly against the bottom of the stem portion that the plug is caused to bulge outwardly. Preferably, but not necessarily, the stem portion 15 is mounted to move axially with, but to rotate relatively to, the valve stem 19. This stem has the usual threaded engagement at 20 with the upper portion of the valve housing and a handle 21 is rigidly connected to the upper end of the stem so as to rotate the stem in its threads and to cause the valve plug to move toward and away from the bore 13 in the operative position of Fig. 1.

The outside diameter of the plug 14 is not substantially greater than the diameter of the bore 13 so that the device may be assembled by pushing the plug downwardly from the top as viewed in Fig. 1 until the plug reaches the operative position there shown. The usual sealing means is provided between the stem and the valve housing as indicated at 22. Upward movement of the stem is limited by the threaded portion of the stem 19 striking the packing. Downward movement of stem portion 15 and plug 14 is limited by the boss 21a on the handle striking the packing gland 23 which is threaded into the valve housing.

The present invention is directed to providing a plurality of progressively available annular line contact sealing zones between the resilient plug 14 and the valve bore 13. As clearly shown in Figs. 1 and 2, the plug 14 has a series of parallel annular corrugations or ribs extending entirely around the periphery of the plug in planes at right angles to the axis of the stem portion 15. The outermost diameter of these ribs may vary from 24 at the top having a diameter equal to or slightly less than the diameter of the bore 13 to rib 25 at the bottom having a diameter slightly greater than the diameter of bore 13. The lower end of the bore 13 is flared outwardly by chamfering, tapering or by curving the wall outwardly so that the plug 14 enters easily into the bore 13 as the plug is moved upwardly from the position of Fig. 1 to the position of Fig. 2. It results from this construction, as clearly shown in Fig. 2, that one of the annular ribs, in this case 14b', will engage the bore 13 at or near the zone 13b where the narrowest portion of the bore begins. Since the ribs or corrugations 14b become progressively greater in diameter downwardly from the plug, it is obvious that the plug need only be drawn up sufficiently until one of the ribs 14b closes the bore 13.

The advantages of this form of my invention should now be apparent. As the plug 14 is drawn upwardly into the bore 13 to close the valve, the ribs 14b give a wiping action against the zone or shoulder 13b so that even in the case of dirty liquid, a good seal is formed and the dirt is wiped away as the plug seals. Furthermore, there is turbulence of the fluid as it passes through the narrowing zone where the plug finally seals against the bore 13 and this prevents singing and chattering of the valve. There is an additional advantage, that if one of the ribs 14b, which usually does the sealing, when the valve is new, becomes worn, then the next lower rib on the plug may be relied upon to provide a new seal so that the wear of the original rib may be disregarded.

In Fig. 3, the parts of Fig. 2, have been reversed. In Fig. 3, the plug 26 is mounted upon the stem portion 27 by a screw 28 in a manner entirely analogous to the description just given. Here the plug 26 has its outermost side walls formed in the shape of a truncated cone. Annular corrugations or ribs 29 are formed on the interior wall of the valve bore 30. The lower end of the bore is flared outwardly as shown at 30a to guide the plug and to aid in the sealing action as the plug moves upwardly into the bore. Here the inner crests of the ribs 29 lie generally on the surface of a cylinder. Thus, as the tapered plug 26 is drawn upwardly into the bore, at some point the plug engages one of the ribs 29 in an annular line contact so as to form a good seal. Here, as in the previously described form of my invention, the friction of closing the valve is reduced by limiting the area of contact between the sealing plug and the bore of the valve, also the fluid is rendered turbulent just where the closing action takes place because of the arrangement of the ribs 29, and a wiping action is provided as the plug reaches its closed position so as to wipe away all dirt and provide a good seal. It will be noted that the upper diameter of the plug 26 is equal to or slightly less than the inner diameter of the bore 30 and the lower base diameter of the plug 26 is greater than the diameter of the bore 30 in a slight degree. However, the plug 26 is of such diameter and resiliency that it may be passed downwardly through the bore 30 when assembling the valve.

In Fig. 4, I have shown a modification of Fig. 2 wherein the plug 31 is assembled on the valve stem portion 32 by means of the screw 33 in a manner similar to the previously described constructions. Here, all of the annular ribs 34 extending around the plug 31 have their outermost crests of equal diameter so that the generally cylindrical plug pulls upwardly into the lower tapered portion 35a of the bore 35. The taper 35a is preferably at an angle of 5 to 10° to the vertical. It results from this construction that the uppermost rib 36 of the resilient plug 31 will provide a line contact against the tapered wall 35a as the plug is moved into sealing position. If this rib becomes worn then the next lower rib 37 will seal. The diameter of plug 31 is only slightly greater than the narrowest diameter of the bore 35 and the plug is of such resiliency that the valve may be assembled by pushing the plug downwardly from above until the parts reach operative position as indicated in Fig. 4.

In Fig. 5 is shown a reversal of the parts of Fig. 4 in a form of valve which is somewhat analogous to the form shown in Fig. 3. Here the plug 38 is mounted on the valve stem portion 39 by means of the screw 40 in all respects analogous to the valve mountings previously described herein. The plug 38 has an outer cylindrical wall and the valve bore 41 has a lower corrugated portion which flares outwardly as it extends downwardly and is provided with a plurality of corrugated ribs which increase in diameter from 41a to 41b to 41c. It results from this construction that as the plug 38 is drawn upwardly into the valve housing, the outer wall of the plug 38 finally reaches a rib 41a, 41b, or 41c where a line seal takes place. If the plug wears, it need only be drawn somewhat farther up in order to provide a good seal. Here again, a wiping contact is made as the plug is sealed so that dirty fluid may be sealed tightly. The corrugations or ribs 41a, 41b, and 41c give a turbulence to the fluid as the sealing action takes place so as to minimize the singing or chattering often found in valves of this type. Here again, the plug 38 is of such diameter and resilience that it may be passed downwardly through the bore 31 until the parts reach operative position.

In all forms of my device, the upper end of the valve bore 13, 30, 35, or 41 has been flared outwardly so as to cam the resilient valve plug inwardly as the valve is passed downwardly through the bore in an assembling operation.

In Figs. 6, 7, and 8, I have shown other forms of resilient plugs adapted to be mounted in the position of the plug 14 on a stem portion analogous to stem portion 15 and to be used in a like manner as described in the various forms of my invention. While the plugs of Figs. 6, 7, and 8 are shown as tapering outwardly and downwardly, that is, becoming greater in diameter the farther you move down the plug, it should be understood that these plugs might be generally cylindrical like the plug of Fig. 4 and seal in a tapered bore. In Fig. 6, the sealing ribs 42a on the plug 42 are V-shape in section and obviously will provide a plurality of line seals as the plug is drawn upwardly into the valve bore. In Fig. 7, the ribs 43a on the resilient plug 43 are of saw-tooth form and will provide a plurality of line seals as the plug is closed. In Fig. 8, the parallel annular ribs 44a of the resilient plug 44 are of square or Acme-thread shape and will provide a plurality of line contacts as the plug is closed.

In the forms of my invention shown in Figs. 7 and 8, there is an upstream extending flat radial area on the ribs 43a and 44a against which the fluid pressure is exerted as the plug moves into sealing position. The pressure of the fluid upwardly against these flat surfaces of the ribs 43a and 44a will aid in the sealing action of these two forms of my sealing plug.

What I claim is:

1. A valve comprising a housing having a fluid inlet and a fluid outlet and an inner connecting passage therebetween, a compressible resilient plug part at the upstream end of said passage, coaxial therewith and axially movable relative thereto, said plug part being insertable in the upstream part of said passage, one of said parts being cylindrical and the other of said parts being frusto-conical, one of said parts having a plurality of uninterrupted parallel peripheral ribs lying in planes at right angles to the axis of said plug, and one only of said ribs adapted to make an initial line contact with the other of said parts to immediately seal said passage against the flow of liquid therethrough.

2. A valve comprising a housing having a fluid inlet and a fluid outlet and an inner connecting passage therebetween, a compressible resilient plug at the upstream end of said passage, coaxial therewith and axially movable relative thereto, the upstream end of said passage having a cylindrical portion into which said plug is insertable, and a plurality of peripheral ribs extending outwardly from said plug, each rib lying in a plane at right angles to the axis of said plug, the outer peripheries of said ribs lying on the frustum of a cone, and one only of said ribs being adapted to make an initial continuous line contact with the wall of said passage to seal said passage against the flow of liquid therethrough.

3. The combination of claim 2 wherein the surface formed by said ribs on said plug is smoothly sinuous and substantially firm to insure positive initial line contact.

4. The combination of claim 3 wherein the upper wall of said plug is compressibly secured to a stem by fastening means so as to prevent singing and chattering.

5. A valve for cooperation with a substantially cylindrical valve bore of predetermined diameter and comprising a stem, a resilient sealing plug secured to said stem, said plug being of generally frusto-conical form having its base of smaller diameter downstream and of slightly less diameter than said bore and having an upstream base of slightly larger diameter than said bore, said stem having a flange portion extending over substantially the entire area of said base of smaller diameter, said flange portion having a diameter less than the diameter of said bore, said plug being radially compressible to the diameter of said bore, whereby said plug will pass wholly into said bore, the diverging side walls of said plug having a plurality of uninterrupted parallel annular peripheral ribs lying in planes at right angles to the axis of said plug, one only of said ribs adapted to make an initial line contact with said bore as said plug is moved into the upstream end of said bore, whereby to immediately seal off said bore at which time said flange portion prevents chattering and singing of said plug as it moves into sealing engagement with said bore.

(References on following page)

References Cited in the file of this patent

UNITED STATES PATENTS

| | | |
|---|---|---|
| 167,010 | Moffet | Aug. 24, 1875 |
| 558,744 | Schroppel | Apr. 21, 1896 |
| 729,835 | Barnes | June 2, 1903 |
| 1,406,748 | Massip | Feb. 14, 1922 |
| 1,577,539 | Polk | Mar. 23, 1926 |
| 1,919,232 | Lee | July 25, 1933 |
| 1,968,965 | Smith | Aug. 7, 1934 |
| 2,148,850 | Deakins | Feb. 28, 1939 |
| 2,219,324 | Lee | Oct. 29, 1940 |
| 2,240,129 | Broecker | Apr. 29, 1941 |
| 2,299,068 | Gora | Oct. 20, 1942 |
| 2,311,748 | Gora | Feb. 23, 1943 |
| 2,489,623 | Delany | Nov. 29, 1949 |

FOREIGN PATENTS

| | | |
|---|---|---|
| 615,121 | France | 1926 |